(12) United States Patent
Maeda et al.

(10) Patent No.: US 8,838,340 B2
(45) Date of Patent: Sep. 16, 2014

(54) ELECTRIC POWER STEERING SYSTEM

(75) Inventors: Shingo Maeda, Okazaki (JP); Yuji Kariatsumari, Yamatotakada (JP)

(73) Assignee: JTEKT Corporation, Osaka (JP)

( * ) Notice: Subject to any disclaimer, the term of this patent is extended or adjusted under 35 U.S.C. 154(b) by 515 days.

(21) Appl. No.: 13/219,928

(22) Filed: Aug. 29, 2011

(65) Prior Publication Data
US 2012/0059550 A1  Mar. 8, 2012

(30) Foreign Application Priority Data
Sep. 6, 2010  (JP) .................................. 2010-199041

(51) Int. Cl.
*B62D 6/08*  (2006.01)

(52) U.S. Cl.
USPC ................ 701/42; 701/41; 180/443; 180/446

(58) Field of Classification Search
USPC ............................... 701/42–43; 180/443, 446
See application file for complete search history.

(56) References Cited

U.S. PATENT DOCUMENTS

| | | | | |
|---|---|---|---|---|
| 6,039,144 | A * | 3/2000 | Chandy et al. ................ | 180/446 |
| 6,260,655 | B1 | 7/2001 | Mukai et al. | |
| 8,634,989 | B1 * | 1/2014 | Schramm ........................ | 701/41 |
| 2006/0162987 | A1 * | 7/2006 | Hagl ............... | 180/411 |
| 2007/0100524 | A1 * | 5/2007 | Sakaguchi et al. .............. | 701/41 |
| 2007/0299583 | A1 * | 12/2007 | Fujita et al. ...................... | 701/41 |
| 2009/0105907 | A1 * | 4/2009 | Yamaguchi et al. ............ | 701/41 |
| 2009/0228173 | A1 * | 9/2009 | Bolio et al. ...................... | 701/41 |
| 2010/0121530 | A1 | 5/2010 | Suzuki et al. | |
| 2012/0197493 | A1 * | 8/2012 | Fujimoto et al. ................ | 701/41 |
| 2013/0304327 | A1 * | 11/2013 | Morishita et al. ............... | 701/43 |

FOREIGN PATENT DOCUMENTS

| | | |
|---|---|---|
| JP | A-2002-120741 | 4/2002 |
| JP | A-2002-127922 | 5/2002 |
| JP | 2011-002563 | * 1/2011 |
| JP | 2011-002564 | * 1/2011 |

OTHER PUBLICATIONS

Design of control logic and compensation strategy for electric power steering systems; Tsung-Hsien Hu ; Chih-Jung Yeh ; Shih-Rung Ho ; Tsung-Hua Hsu ; Ming-Chih Lin; Vehicle Power and Propulsion Conference, 2008. VPPC '08. IEEE Digital Object Identifier: 10.1109/VPPC.2008.4677471; Publication Year: 2008 , pp. 1-6.*

(Continued)

*Primary Examiner* — Cuong H Nguyen
(74) *Attorney, Agent, or Firm* — Oliff PLC

(57) ABSTRACT

An electric power steering system determines a steering state of a steering wheel on the basis of a current (Im) of a motor applying assist force to a steering system and a steering speed ($\omega s$) of the steering wheel. A state where the steering wheel is retained at a position other than a neutral position is a retained state, and a state where the steering wheel is placed at the neutral position is a neutral state. When the steering speed ($\omega s$) is lower than a determination value ($\omega a$) and the motor current (Im) is larger than a reference value (Ix), it is determined whether the steering state is the neutral state. When the steering speed ($\omega s$) is lower than the determination value ($\omega a$), the motor current (Im) is larger than the reference value (Ix), and the steering state is determined to be the neutral state at immediately preceding determination, the steering state is determined to be the neutral state.

3 Claims, 7 Drawing Sheets

(56) References Cited

OTHER PUBLICATIONS

The Development of Control Unit in Automotive Electric Power Steering System; Zeng Qun ; Huang Juhua Information Processing, 2009. APCIP 2009. Asia-Pacific Conference on ; vol. 1; Digital Object Identifier: 10.1109/APCIP.2009.68; Publication Year: 2009 , pp. 242-245.*

Research on Electric Power Steering System Based on Compound Control of CMAC and PID ;Peilin Shi ; Shixiang Gao ; Yi Wang Intelligent Information Technology and Security Informatics, 2009. IITSI '09. Second International Symposium on; Digital Object Identifier: 10.1109/IITSI.2009.15; Publication Year: 2009 , pp. 39-41; IEEE Conference.*

Introduction on dynamic motion of opposite and parallel steering for electric vehicle; Ishak, M.I. ; Ogino, H. ; Oshinoya, Y. Systems, Process & Control (ICSPC), 2013 IEEE Conference on; Digital Object Identifier: 10.1109/SPC.2013.6735106 Publication Year: 2013 , pp. 73-78.*

Field weakening control of PMSM used in an electric power steering system; Ji Xuewu ; Lv Yingchao; Electric Information and Control Engineering (ICEICE), 2011 International Conference on; Digital Object Identifier: 10.1109/ICEICE.2011.5776816 Publication Year: 2011 , pp. 2194-2199; IEEE Conference Publications.*

Polygonal curves of assistant torque characteristic design for electric power steering system; Hu Chun-Hua ; He Ren Control Conference (CCC), 2011 30th Chinese; Publication Year: 2011 , pp. 5505-5508; IEEE Conference Publications.*

Study on control of steering column angle for EPS based on immune-PID algorithm; Ning Shenghua et al.; Computer Application and System Modeling (ICCASM), 2010 International Conference on; vol. 2; Digital Object Identifier: 10.1109/ICCASM.2010.5620539; Pub. Year: 2010 , pp. V2-442-V2-445.*

Extended Search Report issued in European Patent Application No. 11179815.3 dated Oct. 16, 2012.

* cited by examiner

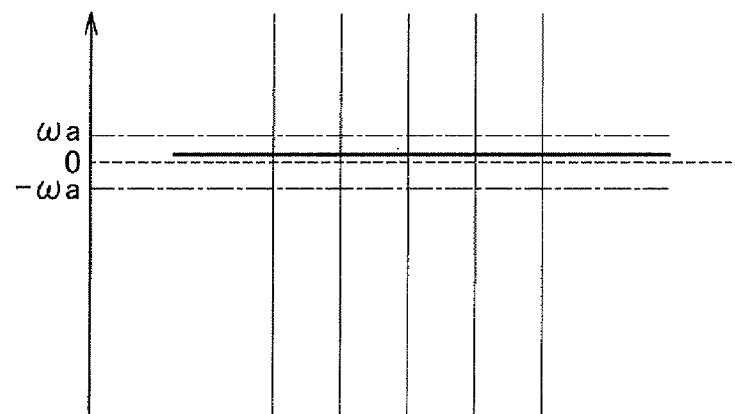
FIG.6A STEERING SPEED ωs
FIG.6B MOTOR CURRENT Im
FIG.6C STEERING STATE

FIG.7A
STEERING SPEED $\omega s$
FIG.7B
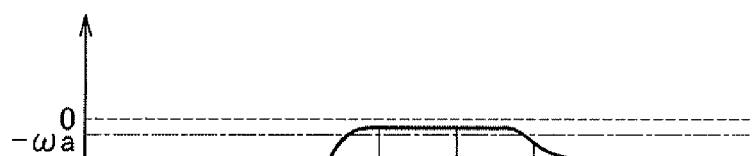
MOTOR CURRENT Im
REFERENCE VALUE Ix
FIG.7C
STEERING STATE
ROTATING STATE
RETAINED STATE
NEUTRAL STATE
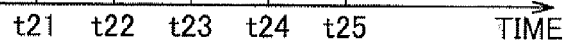
TIME

ELECTRIC POWER STEERING SYSTEM

INCORPORATION BY REFERENCE

The disclosure of Japanese Patent Application No. 2010-199041 filed on Sep. 6, 2010, including the specification, drawings and abstract, is incorporated herein by reference in its entirety.

BACKGROUND OF THE INVENTION

1. Field of the Invention

The invention relates to an electric power steering system that determines a steering state of a steering wheel on the basis of at least one of detected current and voltage of a motor that applies assist force to a steering system, and a steering speed of the steering wheel.

2. Description of Related Art

An electric power steering system described in Japanese Patent Application Publication No. 2002-120741 (JP-A-2002-120741) determines that the steering state of a steering wheel is a retained state on the basis of the fact that the steering speed of the steering wheel is lower than a predetermined value. In addition, when, in addition to the determination that the steering state is a retained state, the determination that the current of the motor is smaller than a predetermined value is made, it is determined that the steering state of the steering wheel is a neutral state.

When the steering state of the steering wheel is maintained in the neutral state in a situation where side wind acts on the vehicle, relatively large assist force is applied from the motor to the steering system and then the current of the motor may be larger than the predetermined value. However, according to the method of determining a steering state, described in JP-A-2002-120741, when the current of the motor is larger than or equal to the predetermined value although the steering state of the steering wheel is the neutral state, it may be determined that the steering state is a retained state.

SUMMARY OF THE INVENTION

It is an object of the invention to provide an electric power steering system that is able to reduce the frequency of erroneous determination regarding the steering state of the steering wheel.

An aspect of the invention relates to an electric power steering system. The electric power steering system determines a steering state of a steering wheel based on at least one of detected values of current and voltage of a motor that applies assist force to a steering system, and a steering speed of the steering wheel. A state where the steering wheel is retained at a position other than a neutral position is a retained state, and a state where the steering wheel is placed at the neutral position is a neutral state. When the steering speed is lower than a determination value and the detected value is larger than a reference value, it is determined whether the steering state of the steering wheel is the neutral state.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 6A to FIG. 6C are timing charts that show an example of a mode in which the "motor resistance updating process" according to the embodiment is executed; and FIG. 7A to FIG. 7C are timing charts that show an example of a mode in which the "motor resistance updating process" according to the embodiment is executed.

DETAILED DESCRIPTION OF EMBODIMENTS

Figure 1:
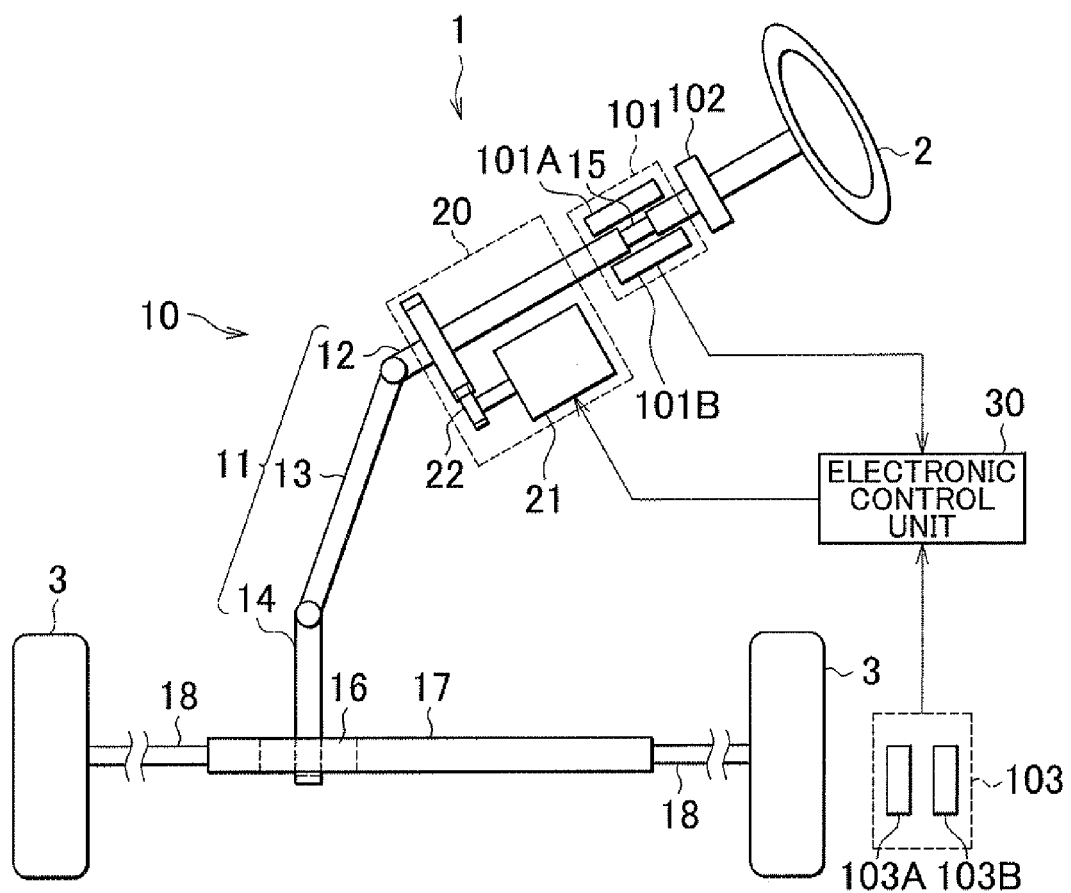
FIG. 1 is a schematic view that schematically shows the overall structure of an electric power steering system according to an embodiment of the invention.

An embodiment of the invention will be described with reference to FIG. 1 to FIG. 7C. FIG. 1 shows the overall configuration of an electric power steering system 1. The electric power steering system 1 includes a steering angle transmission mechanism 10, an EPS actuator 20, an electronic control unit 30 and a plurality of sensors. The steering angle transmission mechanism 10 transmits the rotation of a steering wheel 2 to steered wheels 3. The EPS actuator 20 applies force for assisting the operation of the steering wheel 2 (hereinafter, "assist force") to the steering angle transmission mechanism 10. The electronic control unit 30 controls the EPS actuator 20. The sensors detect the operating states, and the like, of various devices.

The steering angle transmission mechanism 10 includes a steering shaft 11, a rack and pinion mechanism 16, a rack shaft 17 and tie rods 18. The steering shaft 11 rotates together with the steering wheel 2. The rack and pinion mechanism 16 transmits the rotation of the steering shaft 11 to the rack shaft 17. The rack shaft 17 operates the tie rods 18. The tie rods 18 respectively operate knuckles.

The steering shaft 11 includes a column shaft 12, a pinion shaft 14 and an intermediate shaft 13. The steering wheel 2 is fixed to an end portion of the column shaft 12. The pinion shaft 14 moves the rack shaft 17 in the axial direction via the rack and pinion mechanism 16. The intermediate shaft 13 connects the column shaft 12 and the pinion shaft 14 to each other. A torsion bar spring 15 is provided in an intermediate portion of the column shaft 12.

The EPS actuator 20 includes a motor 21 and a reduction mechanism 22. The motor 21 applies torque to the steering shaft 11 (column shaft 12). The reduction mechanism 22 reduces the speed of rotation of the motor 21. A direct-current motor with a brush is provided as the motor 21. The rotation of the motor 21 is reduced in speed by the reduction mechanism 22 and is then transmitted to the steering shaft 11. At this time, torque applied from the motor 21 to the steering shaft 11 acts as assist force.

The steering angle transmission mechanism 10 operates as follows. When the steering wheel 2 is operated, the steering shaft 11 also rotates accordingly. The rotation of the steering shaft 11 is converted into the linear motion of the rack shaft 17 by the rack and pinion mechanism 16. The linear motion of the rack shaft 17 is transmitted to the knuckles via the tie rods 18 that are coupled to respective ends of the rack shaft 17. Then, the turning angle of the steered wheels 3 is changed with the movement of the knuckles.

The steering angle of the steering wheel 2 is determined with reference to a position at which the steering wheel 2 is placed at a neutral position. Where the steering angle at which the steering wheel 2 is placed at the neutral position is "0", when the steering wheel 2 rotates clockwise or counterclockwise from the neutral position, the steering angle increases in accordance with a rotation angle from the neutral position. Note that, in the following description, a speed of change in the steering angle, that is, a rotation speed of the steering wheel 2, is referred to as "steering speed".

The electric power steering system 1 includes a torque sensor 101, a steering sensor 102 and a vehicle speed sensor 103 as the sensors. These sensors respectively output signals corresponding to changes in states to be monitored as follows.

The torque sensor 101 outputs a signal (hereinafter, referred to as "output signal SA"), corresponding to the magnitude of torque applied to the steering shaft 11 through the operation of the steering wheel 2, to the electronic control unit 30. The steering sensor 102 outputs a signal (hereinafter, "output signal SB"), corresponding to a steering angle of the steering wheel 2, that is, a rotation amount of the steering shaft 11 with reference to the neutral position, to the electronic control unit 30. The vehicle speed sensor 103 outputs signals (hereinafter, "output signals SC"), corresponding to rotation speeds of the steered wheels that are rear wheels of the vehicle, to the electronic control unit 30.

The specific configuration of the torque sensor 101 will be described below. The torque sensor 101 is formed of a sensor element 101A, a sensor element 101B and a sensor core (not shown). The sensor element 101A and the sensor element 101B are provided at such positions as to face each other via the torsion bar spring 15. The sensor core (not shown) causes a change in magnetic flux in response to the twist of the torsion bar spring 15. Each of the sensor elements 101A and 101B is arranged around the sensor core, and is formed so as to include a magnetic sensing element that changes its output in response to the twist of the torsion bar spring 15.

The output of the torque sensor 101 changes as follows. When torque is input into the column shaft 12 through the operation of the steering wheel 2, a twist occurs in the torsion bar spring 15 in accordance with the magnitude of the torque. As a result, magnetic flux that passes through each of the sensor elements 101A and 101B of the torque sensor 101 changes. Therefore, a voltage output from each of the sensor elements 101A and 101B, that is, the output signal SA of the torque sensor 101, also changes with a change in magnetic flux.

The specific configuration of the vehicle speed sensor 103 will be described below. The vehicle speed sensor 103 is formed of two sensors, that is, a right rear wheel sensor 103A and a left rear wheel sensor 103B, that are respectively provided so as to correspond to the right rear wheel and the left rear wheel. Each of the sensors 103A and 103B outputs one pulse as the output signal SC, each time the corresponding rear wheel turns 360 degrees. That is, the vehicle speed sensor 103 outputs a signal corresponding to the rotation speed of the right rear wheel and a signal corresponding to the rotation speed of the left rear wheel.

The electronic control unit 30 calculates the following values on the basis of the outputs of the sensors. On the basis of the output signal SA of the torque sensor 101, the electronic control unit 30 calculates a value corresponding to the magnitude of torque input into the steering shaft 11 (hereinafter, "steering torque $\tau$") through the operation of the steering wheel 2.

On the basis of the output signal SB of the steering sensor 102, the electronic control unit 30 calculates a value corresponding to the steering angle of the steering wheel 2 (hereinafter, "steering angle $\theta s$"). In addition, on the basis of the calculated steering angle $\theta s$, the electronic control unit 30 calculates a value corresponding to the rotation speed of the steering shaft 11 (hereinafter, "steering speed $\omega s$").

On the basis of the output signals SC of the vehicle speed sensor 103, that is, the output signal SC of the right rear wheel sensor 103A and the output signal SC of the left rear wheel sensor 103B, the electronic control unit 30 calculates a value corresponding to the running speed of the vehicle (hereinafter, "vehicle speed V").

The electronic control unit 30 executes power assist control and steering torque shift control. In the power assist control, assist force is adjusted in response to the running condition of the vehicle and the steering state of the steering wheel 2. In the steering torque shift control, a steering torque $\tau$ used in the power assist control is corrected.

The steering state of the steering wheel 2 is classified into three states, that is, a "rotating state", a "neutral state" and a "retained state". The "rotating state" indicates the state where the steering wheel 2 is rotating. The "neutral state" indicates the state where the steering wheel 2 is placed at a neutral position. The "retained state" indicates the state where the steering wheel 2 is placed at a position reached by being rotated clockwise or counterclockwise from the neutral position and is retained at this position. The "rotating state" is classified into two states, that is, a "turning state" and a "returning state". The "turning state" means an operation performed in such a direction that the steering angle is increased. The "returning state" means an operation performed in such a direction that the steering angle is reduced.

In the steering torque shift control, the steering torque $\tau$ calculated by the electronic control unit 30 on the basis of the output signal SA of the torque sensor 101 is corrected on the basis of the steering state of the steering wheel 2, and then the corrected steering torque $\tau$ is output as a "corrected steering torque $\tau a$".

In the power assist control, on the basis of the corrected steering torque $\tau a$ calculated through the steering torque shift control and the vehicle speed V calculated on the basis of the output signals SC of the vehicle speed sensor 103, the electronic control unit 30 calculates a target value of assist force (hereinafter, "target assist force"). A driving electric power corresponding to the target assist force is supplied to the motor 21. Thus, the EPS actuator 20 applies a torque, corresponding to the target assist force, to the steering shaft 11.

Figure 2:
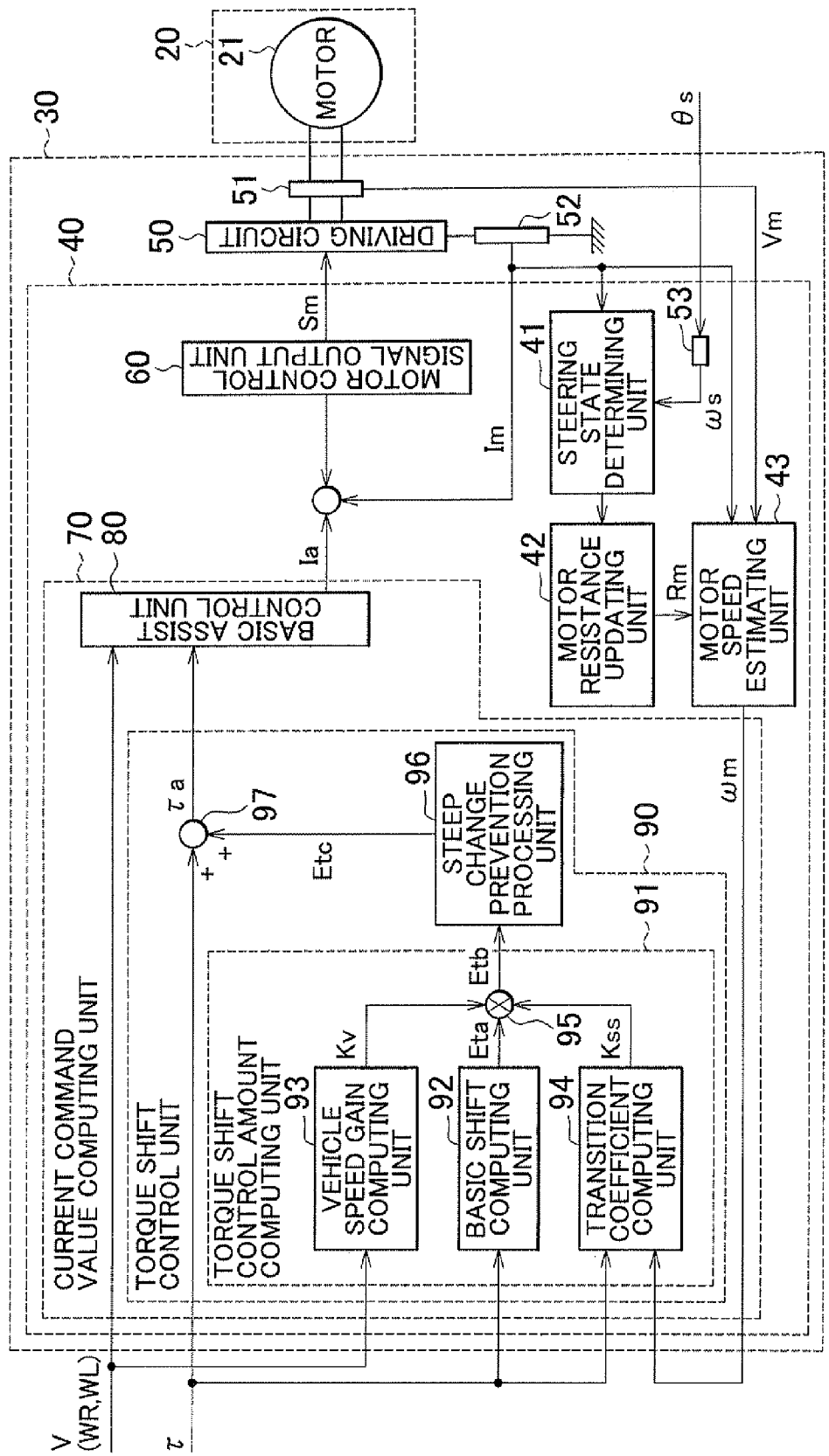
FIG. 2 is a block diagram that shows the configuration of a control system of the electric power steering system according to the embodiment.

The detailed configuration of the electronic control unit 30 will be described with reference to FIG. 2. The electronic control unit 30 includes a microcomputer 40 and a driving circuit 50. The microcomputer 40 outputs a signal for providing instructions on the magnitude of driving electric power supplied to the motor 21 (hereinafter, "motor control signal Sm"). The driving circuit 50 supplies the motor 21 with a driving electric power corresponding to the motor control signal Sm.

The driving circuit 50 includes a voltage sensor 51 and a current sensor 52. The voltage sensor 51 detects a voltage between the terminals of the motor 21 (hereinafter, "motor voltage Vm"). The current sensor 52 detects a current supplied to the motor 21 (hereinafter, "motor current Im"). Control blocks provided in the microcomputer 40 are formed of computer programs.

The microcomputer 40 includes a current command value computing unit 70 and a motor control signal output unit 60. The current command value computing unit 70 calculates a current value required to cause the EPS actuator 20 to generate a torque corresponding to the target assist force (hereinafter, "current command value Ia"), that is, a target value of current supplied to the motor 21. The motor control signal output unit 60 generates the motor control signal Sm on the basis of the current command value Ia and the motor current Im.

In addition, the microcomputer 40 includes a steering state determining unit 41, a motor resistance updating unit 42, a motor speed estimating unit 43 and a differentiator 53. The steering state determining unit 41 determines the steering state of the steering wheel 2 on the basis of the motor voltage Vm and the motor current Im. The motor speed estimating unit 43 calculates the rotation speed of the motor 21 (hereinafter, "motor speed ωm"). The differentiator 53 differentiates the steering angle θs to calculate the steering speed ωs.

Furthermore, the microcomputer 40 includes a steering torque detecting unit and a storage unit (both are not shown). The steering torque detecting unit calculates the steering torque τ on the basis of the output signal SA of the torque sensor 101. The storage unit, for example, stores the results obtained through various computations.

The current command value computing unit 70 includes a basic assist control unit 80 and a torque shift control unit 90. The basic assist control unit 80 calculates a basic component of target assist force (hereinafter, "basic control amount Ias") on the basis of the vehicle speed V and the steering torque τ. The torque shift control unit 90 corrects the steering torque τ on the basis of the vehicle speed V and the motor speed ωm.

The basic assist control unit 80 calculates the basic control amount Ias as follows.

The basic assist control unit 80 sets the basic control amount Ias to a larger value as the corrected steering torque τa calculated by the torque shift control unit 90 becomes larger. That is, the target assist force is increased as the corrected steering torque τa increases.

The basic assist control unit 80 sets the basic control amount Ias to a larger value as the vehicle speed V becomes smaller. That is, the target assist force is increased as the vehicle speed V decreases.

The motor control signal output unit 60 executes feedback control over the current command value Ia on the basis of the current command value Ia and the motor current Im, and generates the motor control signal Sm on the basis of the resultant current command value Ia. In addition, the generated motor control signal Sm is output to the driving circuit 50.

The motor speed estimating unit 43 calculates the motor speed ωm according to the following mathematical expression 1) used as a motor equation.

$$\omega m = (Vm - Im \times Rm)/Ke \qquad 1)$$

"Vm" denotes the motor voltage Vm input from the voltage sensor 51. "Im" denotes the motor current Im input from the current sensor 52. "Rm" denotes the motor resistance Rm prestored in the storage unit. A value corresponding to a resistance specific to the motor 21 is used as the motor resistance Rm.

"Ke" denotes a counter electromotive force constant Ke of the motor 21, prestored in the storage unit. A value corresponding to a counter electromotive force constant Ke specific to the motor is used as the counter electromotive force constant Ke.

The steering state determining unit 41 determines the steering state of the steering wheel 2 on the basis of the following Determination condition 1 to Determination condition 3.

Determination condition 1: The steering speed ωs is higher than a determination value ωa.

Determination condition 2: The motor current Im is larger than a reference value Ix.

Determination condition 3: The determined steering state obtained in the immediately preceding computation cycle is the "neutral state".

The determination value ωa is preset as a maximum value of the steering speed ωs at which the steering state of the steering wheel 2 may be regarded as the "neutral state" or the "retained state" or a value corresponding to the maximum value.

The reference value Ix is preset as a maximum assist force that may be applied from the EPS actuator 20 to the steering shaft 11 when the steering state of the steering wheel 2 is the "neutral state" under the condition that large load is not externally applied to the vehicle, or a value corresponding to the maximum assist force.

The steering state is specifically determined as follows. When Determination condition 1 is satisfied, it is determined that the steering state of the steering wheel 2 is the "rotating state". When Determination condition 1 is not satisfied, it is determined that the steering state of the steering wheel 2 is the "neutral state" or the "retained state".

When Determination condition 2 is satisfied, it is determined that relatively large assist force is applied from the EPS actuator 20 to the steering shaft 11. When Determination condition 2 is not satisfied, it is determined that assist force is not applied or relatively small assist force is applied from the EPS actuator 20 to the steering shaft 11.

When Determination condition 3 is satisfied, it is determined that the current steering state of the steering wheel 2 is the "neutral state" or the "rotating state". When Determination condition 3 is not satisfied, it is determined that the current steering state of the steering wheel 2 is the "retained state" or the "rotating state".

When Determination condition 1 is not satisfied, it is not possible to determine whether the steering state of the steering wheel 2 is the "neutral state" or the "retained state" as described above. Therefore, when Determination condition 1 is not satisfied, it is determined whether the steering state of the steering wheel 2 is the "neutral state" or the "retained state" by combination of Determination condition 2 and Determination condition 3.

The motor resistance updating unit 42 calculates the motor resistance Rm on the basis of the steering state of the steering wheel 2 and according to the following mathematical expression 2).

$$EX = Vm - Rm \times Im + L \times (dIm/ds) \qquad 2)$$

"Vm" denotes the motor voltage Vm input from the voltage sensor 51. "Im" denotes the motor current Im input from the current sensor 52. "L" denotes the inductance of the motor 21. "dIm/ds" denotes the rate of change in the current of the motor 21.

"EX" denotes the induced voltage of the motor 21. When the steering wheel 2 is in the retained state, "dIm/ds" and "EX" may be regarded as "0". Therefore, the mathematical expression 2) may be modified into the following mathematical expression 3).

$$Rm = Vm/Im \qquad 3)$$

That is, when the steering wheel 2 is in the retained state, the motor resistance updating unit 42 calculates the motor resistance Rm of the motor 21 on the basis of the motor voltage Vm and the motor current Im. The calculated motor resistance Rm is stored in the storage unit as a new motor resistance Rm that replaces the motor resistance Rm stored in the storage unit at that time.

The torque shift control unit 90 includes a torque shift control amount computing unit 91, a steep change prevention processing unit 96 and an adder 97. The torque shift control amount computing unit 91 computes a compensation component of steering torque shift control (hereinafter, "torque shift control amount Etb"). The steep change prevention processing unit 96 executes filtering for suppressing a steep change in the torque shift control amount Etb. The adder 97 superimposes the torque shift control amount Etc on the steering torque $\tau$ to calculate the corrected steering torque $\tau$a.

The torque shift control amount computing unit 91 includes a basic shift computing unit 92, a vehicle speed gain computing unit 93, a transition coefficient computing unit 94 and a multiplier 95. The basic shift computing unit 92 calculates a basic shift control amount Eta that becomes a basic compensation component of steering torque shift control. The vehicle speed gain computing unit 93 calculates a gain of the basic shift control amount Eta (hereinafter, "vehicle speed gain Kv") on the basis of the vehicle speed V. The transition coefficient computing unit 94 calculates a transition coefficient Kss that indicates the steering state of the steering wheel 2. The multiplier 95 multiplies the basic shift control amount Eta by the vehicle speed gain Kv and by the transition coefficient Kss to calculate the torque shift control amount Etb.

The basic shift computing unit 92 calculates the basic shift control amount Eta as follows.

As the steering torque $\tau$ becomes larger, a larger value is calculated as the basic shift control amount Eta. That is, as the steering torque $\tau$ increases, the target assist force is increased.

When the steering torque $\tau$ is larger than or equal to a predetermined value, the basic shift control amount Eta is kept at a constant value with respect to the steering torque $\tau$.

The vehicle speed gain computing unit 93 calculates the vehicle speed gain Kv as follows.

As the vehicle speed V becomes larger, a larger value is calculated as the vehicle speed gain Kv.

When the vehicle speed V is higher than or equal to a predetermined value, the vehicle speed gain Kv is kept at a constant value with respect to the vehicle speed V.

The transition coefficient computing unit 94 calculates a transition coefficient Kss corresponding to each of the steering state of the steering wheel 2, that is, the "turning state", the "returning state" or the "retained state", on the basis of the direction of the steering torque $\tau$ and the motor speed $\omega$m. The motor speed tom corresponds to the steering speed $\omega$s that is the rotation angular velocity of the steering shaft 11 and the steering wheel 2.

The steep change prevention processing unit 96 filters the torque shift control amount Eth output from the torque shift control amount computing unit 91 using a low-pass filter, and outputs the filtered torque shift control amount Etb to the adder 97 as the torque shift control amount Etc. The low-pass filter is configured as a filter for suppressing a steep change in the torque shift control amount Etb.

The details of a method of calculating the transition coefficient Kss will be described with reference to FIG. 3A and FIG. 3B. The transition coefficient computing unit 94 uses two maps that correlate the direction of the steering torque $\tau$ and the motor speed $\omega$m with the transition coefficient Kss to calculate the transition coefficient Kss. That is, the map (FIG. 3A) in the case where the sign of the steering torque $\tau$ is positive and the map (FIG. 3B) in the case where the sign of the steering torque $\tau$ is negative are used to calculate the transition coefficient Kss.

Figure 3A:
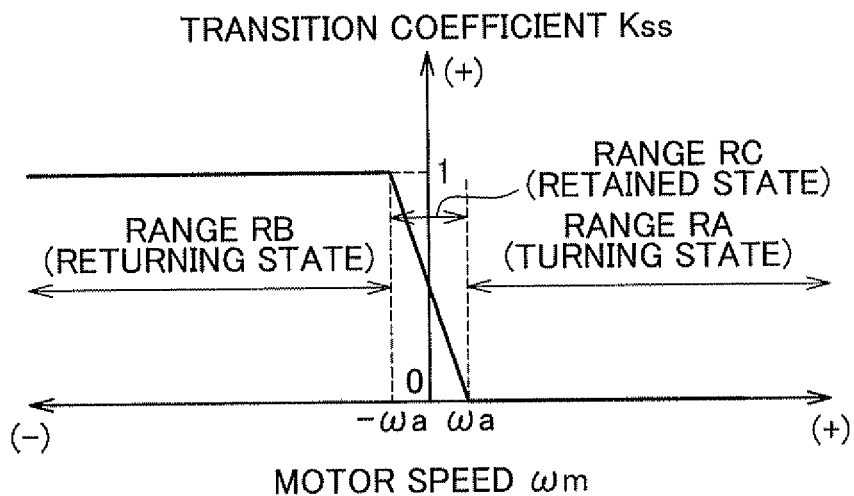
FIG. 3A and FIG. 3B are maps that define the correlations between a motor speed and a transition coefficient, used in steering torque shift control according to the embodiment.

As shown in FIG. 3A, in the map in the case where the sign of the steering torque $\tau$ is positive, the range of the motor speed $\omega$m is divided into three ranges by a determination value $\omega$a and a determination value $-\omega$a. That is, the range of the motor speed $\omega$m is divided into a range RA in which the motor speed $\omega$m is higher than or equal to the determination value $\omega$a, a range RB in which the motor speed $\omega$m is lower than or equal to the determination value $-\omega$a and a range RC in which the motor speed $\omega$m is lower than the determination value $\omega$a and higher than the determination value $-\omega$a.

The range RA is set as a range in which the steering state of the steering wheel 2 is the "turning state". The range RB is set as a range in which the steering state of the steering wheel 2 is the "returning state". The range RC is set as a range in which the steering state of the steering wheel 2 is the "retained state".

In the range RA, the transition coefficient Kss is set to "0". In the range RB, the transition coefficient Kss is set to "1". In the range RC, the transition coefficient Kss is set so as to increase from "0" toward "1" as the motor speed $\omega$m reduces from the determination value $\omega$a toward the determination value $-\omega$a.

Figure 3B:
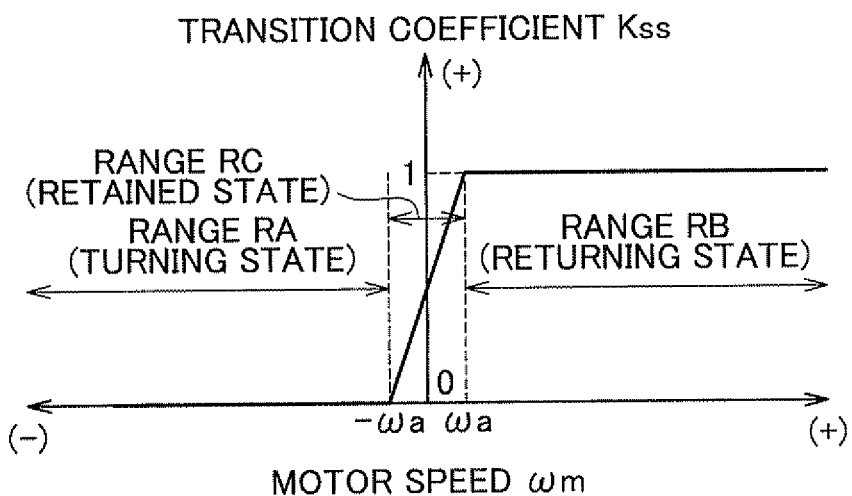

As shown in FIG. 3B, in the map in the case where the sign of the steering torque $\tau$ is negative, the range of the motor speed $\omega$m is divided into three ranges by the determination value $\omega$a and the determination value $-\omega$a. That is, the range of the motor speed $\omega$m is divided into a range RA in which the motor speed $\omega$m is lower than or equal to the determination value $-\omega$a, a range RB in which the motor speed $\omega$m is higher than or equal to the determination value $\omega$a and a range RC in which the motor speed $\omega$m is lower than the determination value $\omega$a and higher than the determination value $-\omega$a.

The range RA is set as a range in which the steering state of the steering wheel 2 is the "turning state". The range RB is set as a range in which the steering state of the steering wheel 2 is the "returning state". The range RC is set as a range in which the steering state of the steering wheel 2 is the "retained state".

In the range RA, the transition coefficient Kss is set to "0". In the range RB, the transition coefficient Kss is set to "1". In the range RC, the transition coefficient Kss is set so as to increase from "0" toward "1" as the motor speed corn increases from the determination value $-\omega$a toward the determination value $\omega$a.

As described above, the transition coefficient computing unit 94 determines the steering state of the steering wheel 2 on the basis of the direction of the steering torque $\tau$ (the sign of the steering torque $\tau$) and the direction of the steering speed $\omega$s (the sign of the motor speed $\omega$m). That is, when the sign of the steering torque $\tau$ coincides with the sign of the motor speed $\omega$m, it is determined that the steering state is the "turning state". When the sign of the steering torque $\tau$ does not coincide with the sign of the motor speed $\omega$m, it is determined that the steering state is the "returning state". When the motor speed $\omega$m is "0" or close to "0" in the case where the steering state is other than the "neutral state", it is determined that the steering state is the "retained state".

In the steering torque shift control, when the steering state of the steering wheel 2 is the "retained state" or the "returning state", the torque shift control amount Etc is calculated such that the basic control amount Ias is increased due to the corrected steering torque $\tau$a. Thus, a driver's force required to maintain the "retained state" is reduced, and a feeling of strangeness experienced by the driver at the time of shifting from the "retained state" to the "returning state" is suppressed. When the steering state is the "turning state", "0" is calculated as the torque shift control amount Etc, that is, the steering torque τ is not corrected by the torque shift control amount Etc. Therefore, occurrence of a phenomenon that the driver experiences a feeling of strangeness due to application of excessively large assist force, that is, a phenomenon that the driver feels that the "steering wheel is light" is suppressed.

As described above, the motor speed ωm used in the steering torque shift control is calculated on the basis of the motor voltage Vm, the motor current Im and the motor resistance Rm. Therefore, in order to accurately execute steering torque shift control, it is required to calculate the motor speed ωm closer to an actual value.

However, the motor resistance Rm changes under the influence of the temperature of the motor 21, the motor current Im, and the like. Therefore, when the motor speed ωm is calculated on the basis of the motor resistance Rm that does not reflect such influence, the motor speed ωm may significantly deviate from an actual motor speed.

Then, the electronic control unit 30 updates the motor resistance Rm on the basis of the motor voltage Vm and the motor current Im, and executes "motor resistance updating process" as process for reducing a deviation between the motor resistance Rm, used in various computations, and an actual motor resistance.

Figure 4:
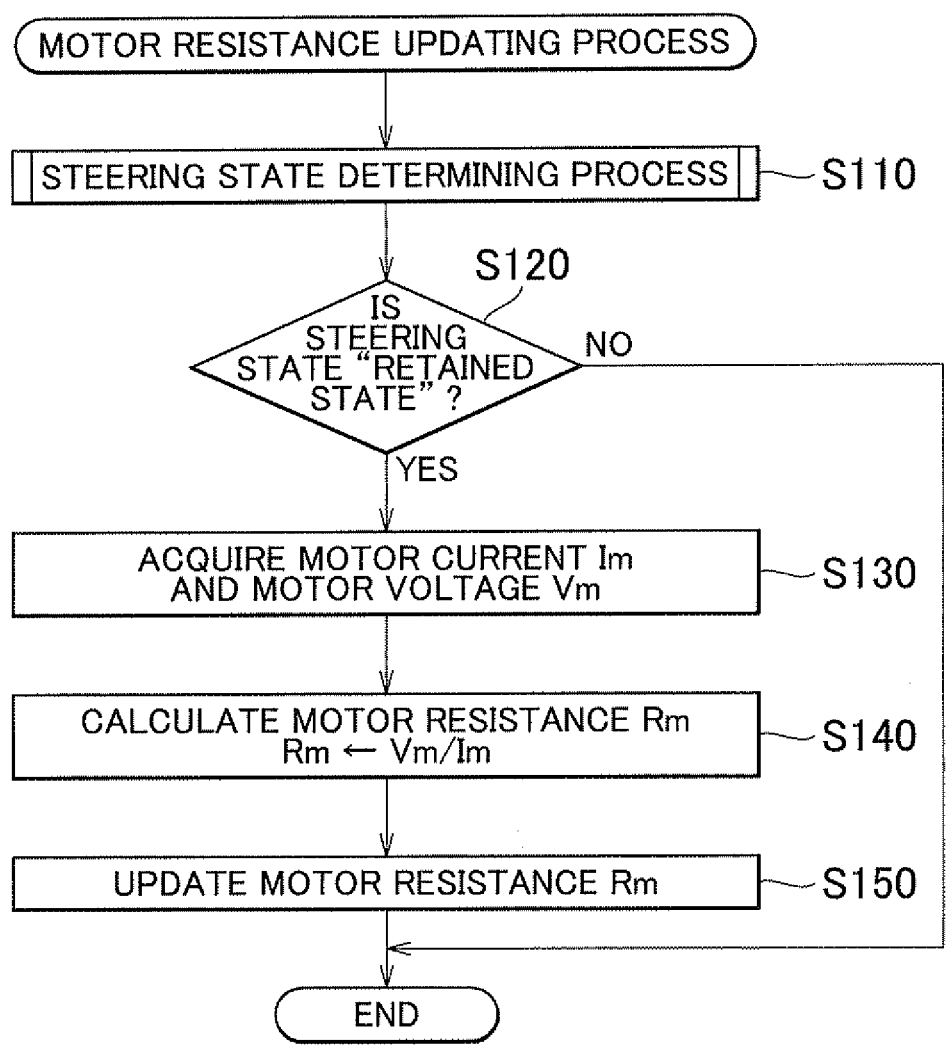
FIG. 4 is a flowchart that shows the procedure of "motor resistance updating process" executed by an electronic control unit according to the embodiment.

The procedure of the "motor resistance updating process" will be described with reference to FIG. 4. Note that the process is repeatedly executed by the microcomputer 40 in each predetermined computation cycle. In step S110, "steering state determining process" shown in FIG. 5 for determining the steering state of the steering wheel 2 is executed. In this process, on the basis of the steering speed ωs, the motor current Im and the determined steering state in the immediately preceding computation cycle, it is determined whether the steering state of the steering wheel 2 is the "rotating state", the "neutral state" or the "retained state".

Figure 5:
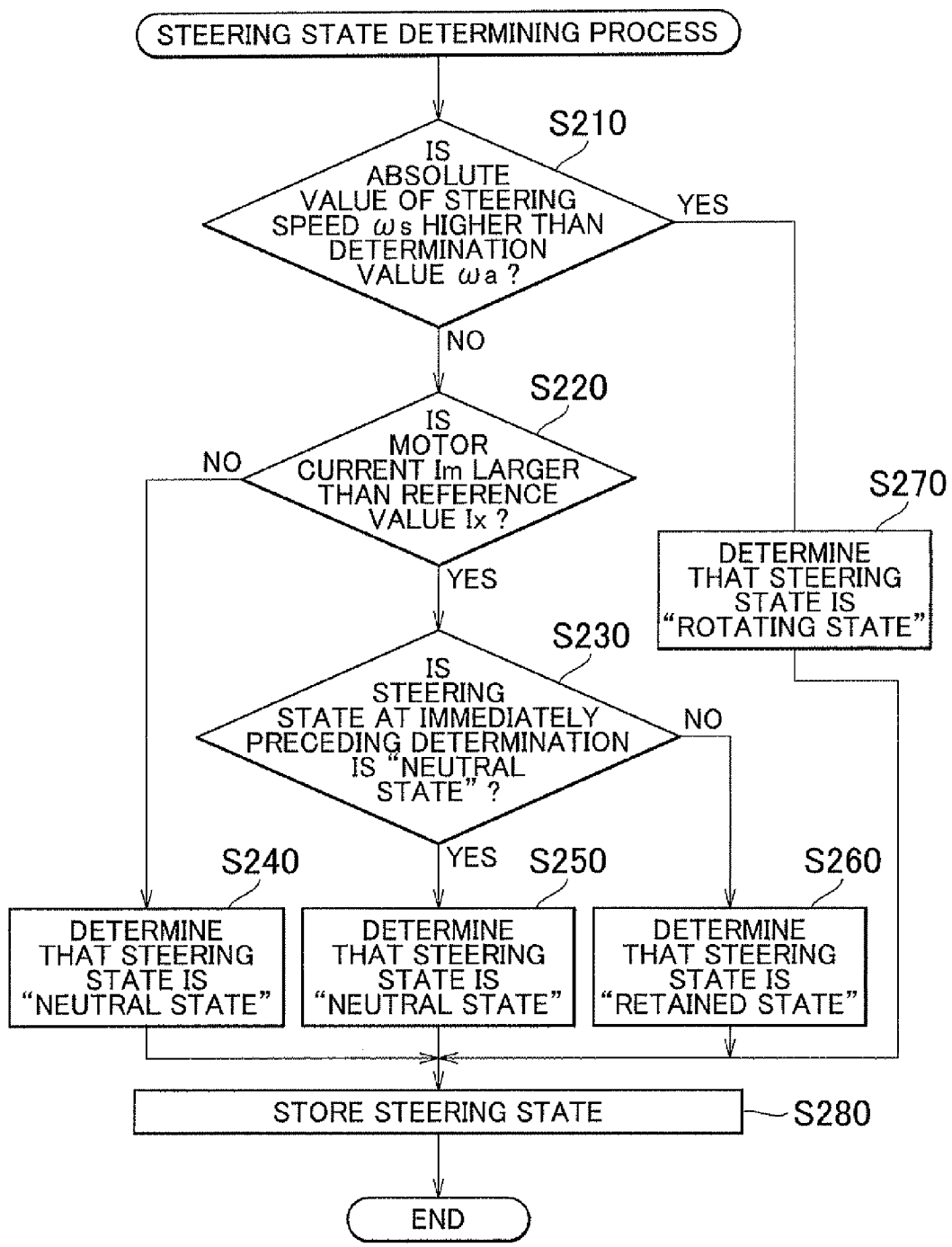
FIG. 5 is a flowchart that shows the procedure of "steering state determining process" executed by the electronic control unit according to the embodiment.

When it is determined in step S120 that the steering state determined through the "steering state determining process" shown in FIG. 5 is the "retained state", the motor current Im and the motor voltage Vm are acquired in the next step S130, and the motor resistance Rm is calculated according to the mathematical expression 3) in the next step S140.

In step S150, the motor resistance Rm calculated in step S140 is set as a new motor resistance Rm. That is, instead of the motor resistance Rm stored in the storage unit at that time, the motor resistance Rm calculated in step S140 is stored in the storage unit.

The concept of the "steering state determining process" will be described. When the steering state of the steering wheel 2 is the "neutral state" or the "retained state", the absolute value of the steering speed ωs is lower than the determination value ωa in both cases. That is, the steering speed ωs is "0" or close to "0". Therefore, with the determination based on only the steering speed ωs, it is not possible to determine whether the steering state is the "neutral state" or the "retained state". On the other hand, when the steering state is the "retained state", the motor current Im tends to be larger than that in the case of the "neutral state".

Therefore, when the absolute value of the steering speed ωs is lower than the determination value ωa and the motor current Im is larger than the reference value Ix, it is estimated that the steering state of the steering wheel 2 is the "retained state".

However, when a load in such a direction that the turning angle of the steered wheels 3 is changed from the neutral position is applied to the steered wheels 3 as in the case where side wind is applied to the vehicle or the vehicle is running on an inclined road surface, relatively large assist force is applied to the steering shaft 11 by the EPS actuator 20 due to the operation for retaining the steering wheel 2 at the neutral position. That is, in a state where the steering state of the steering wheel 2 is the "neutral state", the motor current Im may be larger than the reference value Ix.

In this way, the "neutral state" of the steering wheel 2 includes a "first neutral state" where the assist force of the EPS actuator 20 is "0" or sufficiently small and a "second neutral state" where the assist force of the EPS actuator 20 is relatively large.

Therefore, when the steering state of the steering wheel 2 is determined, it is not possible to accurately determine whether the steering state is the "neutral state" or the "retained state" only by taking into account the steering speed ωs and the motor current Im.

On the other hand, if the fact that the "retained state" is a state where the steering wheel 2 is retained at a position other than the neutral position is taken into account, the steering state definitely passes through the "rotating state" when the steering state shifts from the "neutral state" to the "retained state" or from the "retained state" to the "neutral state".

Therefore, in determination of the steering state using the steering state determining unit 41, if the determination result that the steering state is the "retained state" is obtained subsequently to the determination result that the steering state is the "neutral state", the above determination result that the steering state is the "retained state" indicates a situation that is less likely to occur usually as the transition of an actual steering state.

In the "steering state determining process", in consideration of the above fact, the steering state of the steering wheel 2 is determined on the basis of the above described Determination condition 1 to Determination condition 3. Specifically, when it is determined that the absolute value of the steering speed ωs is lower than the determination value ωa and the motor current Im is larger than the reference value Ix, that is, when it is estimated that the steering state is the "neutral state" or the "retained state", the determined steering state in the immediately preceding computation cycle is referenced, and, on the basis of the determined steering state in the immediately preceding computation cycle, it is determined whether the steering state is the "neutral state" or the "retained state".

According to the above described relationship in transition of the steering state, it is less likely that the current steering state is the "retained state" when the steering state determined in the immediately preceding computation cycle is the "neutral state". Therefore, in this case, it is determined that the steering state is the "neutral state". On the other hand, it is less likely that the current steering state is the "neutral state" when the steering state determined in the immediately preceding computation cycle is not the "neutral state". Therefore, in this case, it is determined that the steering state is the "retained state".

The specific procedure of the "steering state determining process" will be described with reference to FIG. 5. In step S210, it is determined whether the absolute value of the steering speed ωs is higher than the determination value ωa. That is, it is determined whether Determination condition 1 is satisfied.

In step S220, it is determined whether the motor current Im is larger than the reference value Ix. That is, it is determined whether Determination condition 2 is satisfied. In step S230, it is determined whether the steering state determined in the immediately preceding computation cycle is the "neutral state". That is, it is determined whether Determination condition 3 is satisfied.

On the basis of one or more results of determining processes in steps S210 to S230, it is determined whether the steering state of the steering wheel 2 is the "rotating state", the "neutral state" or the "retained state" as the following A) to D).

A) When it is determined in step S210 that Determination condition 1 is satisfied, it is determined in step S270 that the steering state of the steering wheel 2 is the "rotating state".

B) When it is determined in step S210 that Determination condition 1 is not satisfied and it is determined in step S220 that Determination condition 2 is not satisfied, it is determined in step S240 that the steering state of the steering wheel 2 is the "neutral state". The "neutral state" at this time corresponds to the "first neutral state" in which no torque assist is performed.

C) When it is determined in step S210 that Determination condition 1 is not satisfied, it is determined in step S220 that Determination condition 2 is satisfied and it is determined in step S230 that Determination condition 3 is satisfied, it is determined in step S250 that the steering state of the steering wheel 2 is the "neutral state". The "neutral state" at this time corresponds to the "second neutral state" in which torque assist is performed.

D) When it is determined in step S210 that Determination condition 1 is not satisfied, it is determined in step S220 that Determination condition 2 is satisfied and it is determined in step S230 that Determination condition 3 is not satisfied, it is determined in step S260 that the steering state of the steering wheel 2 is the "retained state".

The steering state determining unit 41 determines the steering state of the steering wheel 2 through any one of the processes of steps S240 to S270, and then stores the determined steering state in the storage unit of the microcomputer 40 in step S280. The determined steering state stored in step S280 is referenced, as the steering state determined in the immediately preceding computation cycle, when it is determined whether Determination condition 3 is satisfied in the next computation cycle.

An example of a mode in which the steering state of the steering wheel 2 is determined will be described with reference to FIG. 6A to FIG. 6C. In the time charts, it is assumed that the driver attempts to move the vehicle straight ahead in a state where side wind is applied to the vehicle over a period from time t11 to t15.

At time t11, that is, when a load is applied to the vehicle by side wind, the motor current Im increases. At this time, the absolute value of the steering speed $\omega s$ is lower than the determination value $\omega a$ and the motor current Im is smaller than the reference value Ix. Therefore, it is determined through the "steering state determining process" that the steering state of the steering wheel 2 is the "neutral state".

At time t12, that is, when a load applied to the vehicle by side wind increases and the motor current Im increases to a value just before exceeding the reference value Ix, it is determined through the "steering state determining process" that the steering state of the steering wheel 2 is the "neutral state".

At time t13, that is, when a load applied to the vehicle by side wind further increases and the motor current Im exceeds the reference value Ix, three conditions are satisfied, that is, the absolute value of the steering speed $\omega s$ is lower than the determination value $\omega a$, the motor current Im is larger than the reference value Ix, and it is determined in the determination at time t12 (immediately preceding determination) that the steering state is the "neutral state". Therefore, it is determined through the "steering state determining process" that the steering state is the "neutral state".

At time t14, that is, when a load applied to the vehicle by side wind reduces and the motor current 1m falls below the reference value Ix, it is determined through the "steering state determining process" that the steering state of the steering wheel 2 is the "neutral state".

At time t15, that is, when a load applied to the vehicle by side wind becomes "0" and the motor current Im is sufficiently small, it is determined through the "steering state determining process" that the steering state of the steering wheel 2 is the "neutral state".

An example of a mode in which the steering state of the steering wheel 2 is determined will be described with reference to FIG. 7A to FIG. 7C. In the time charts, it is assumed that the steering wheel 2 is returned during a period from time t21 to time t22, the steering angle of the steering wheel 2 is retained at a constant angle during a period from time t23 to time t24, and then the steering wheel 2 is turned.

At time t21, that is, when the steering speed $\omega s$ increases due to the rotation of the steering wheel 2, the absolute value of the steering speed $\omega s$ is higher than the determination value $\omega a$. Therefore, it is determined through the "steering state determining process" that the steering state of the steering wheel 2 is the "rotating state".

At time t22, that is, when the absolute value of the steering speed $\omega s$ is maximum due to the rotation of the steering wheel 2, the absolute value of the steering speed $\omega s$ is higher than the determination value $\omega a$. Therefore, it is determined through the "steering state determining process" that the steering state of the steering wheel 2 is the "rotating state".

At time t23, that is, when the steering angle of the steering wheel 2 is retained at a constant angle, the steering speed $\omega s$ is substantially "0". At this time, three conditions are satisfied, that is, the absolute value of the steering speed $\omega s$ is lower than the determination value $\omega a$, the motor current Im is larger than the reference value Ix, and it is determined in the determination at time t22 (immediately preceding determination) that the steering state is the "rotating state". Therefore, it is determined through the "steering state determining process" that the steering state of the steering wheel 2 is the "retained state".

At time t24, that is, when the steering speed $\omega s$ is substantially "0" because the steering wheel 2 is retained at a constant angle, it is determined through the "steering state determining process" that the steering state of the steering wheel 2 is the "retained state" as in the case of time t23.

At time t25, that is, when the absolute value of the steering speed $\omega s$ increases due to the rotation of the steering wheel 2, the absolute value of the steering speed $\omega s$ is higher than the determination value $\omega a$. Therefore, it is determined through the "steering state determining process" that the steering state of the steering wheel 2 is the "rotating state".

Note that, in the "steering state determining process", the steering state determined in the immediately preceding computation cycle is referenced in order to determine whether the steering state is the "neutral state" or the "retained state". Instead, a method of determining the steering state may be employed, in which the reference value Ix is changed to a value sufficiently larger than that of the "steering state determining process" (imaginary reference value Iy).

A mode in which the steering state is determined on the basis of the above method will be described with reference to FIG. 7A to FIG. 7C. The solid line in the time charts shows a change in the motor current Im from when the steering state of the steering wheel 2 is the "rotating state" to when the steering state is the "retained state". In addition, the broken line shows a change in the motor current Im from when the steering state of the steering wheel 2 is the "first neutral state" to when the steering state is the "second neutral state".

The imaginary reference value Iy is set to a value corresponding to an assist force that is larger than the maximum assist force that may be applied from the EPS actuator 20 to the steering shaft 11 at the time when the steering state of the steering wheel 2 is the "second neutral state".

In this case, when the absolute value of the steering speed ωs is lower than the determination value ωa and the motor current Im is smaller than the imaginary reference value Iy, it may be determined that the steering state of the steering wheel 2 is the "second neutral state".

However, even when the steering state is actually the "retained state" indicated by the solid line in FIG. 7A to FIG. 7C due to the fact that the imaginary reference value Iy is set as an excessively large value, it is determined through the "steering state determining process" that the steering state is the "neutral state".

In this way, with the determining method using the imaginary reference value Iy, that is, the determining method in which the determination value of the motor current Im is set to be sufficiently larger than the reference value Ix, the frequency of determination that the steering state is the "neutral state" despite the fact that the steering state is actually the "retained state" is high. Therefore, the frequency of updating the motor resistance Rm through the "motor resistance updating process" reduces.

In terms of this point, in the "steering state determining process" according to the present embodiment, the reference value Ix is set for the motor current Im, and the process of step S230 is executed to thereby determine whether the steering state is the "neutral state" or the "retained state". Therefore, the frequency of erroneous determination regarding the steering state reduces as described above. Therefore, the frequency of not updating the motor resistance Rm through the "motor resistance updating process" also reduces.

According to the present embodiment, the following operation and advantageous effects are obtained.

1) In the present embodiment, when the absolute value of the steering speed ωs is lower than the determination value ωa and the motor current Im is larger than the reference value Ix, it is determined whether the steering state of the steering wheel 2 is the neutral state.

With the existing method of determining the steering state, when the absolute value of the steering speed ωs is lower than the determination value ωa and the motor current Im is larger than the reference value Ix, it is determined that the steering state of the steering wheel 2 is the retained state. However, the above condition may be satisfied when the steering state is the neutral state.

In the above configuration, in consideration of this point, when the absolute value of the steering speed ωs is lower than the determination value ωa and the motor current Im is larger than the reference value Ix, it is determined whether the steering state of the steering wheel 2 is the neutral state. That is, before it is determined that the steering state is the retained state on the basis of the fact that the above described condition is satisfied, whether the steering state is the neutral state is checked. Therefore, it is possible to reduce the frequency of erroneous determination regarding the steering state of the steering wheel 2.

2) In the present embodiment, when the absolute value of the steering speed ωs is lower than the determination value ωa and the motor current Im is larger than the reference value Ix, it is determined on the basis of the steering state of the steering wheel 2 at the time of immediately preceding determination whether the steering state of the steering wheel 2 is the neutral state or the retained state.

When the steering state of the steering wheel 2 shifts between the neutral state and the retained state, the steering state definitely passes through the rotating state in which the steering wheel 2 is rotating. Therefore, when the steering state determined at the time of the immediately preceding determination is the neutral state, it is less likely that an actual steering state is the retained state at the time the current determination. That is, when the absolute value of the steering speed ωs is lower than the determination value ωa and the motor current Im is larger than the reference value Ix, the steering state determined at the time of the immediately preceding determination is referenced, to thereby make it possible to determine whether the current steering state is the neutral state or the retained state.

In the above configuration, in consideration of this point, when the absolute value of the steering speed ωs is lower than the determination value ωa and the motor current Im is larger than the reference value Ix, the steering state of the steering wheel 2 at the time of the immediately preceding determination is referenced. Therefore, it is possible to accurately determine whether the steering state is the neutral state or the retained state.

3) In the present embodiment, when the absolute value of the steering speed ωs is lower than the determination value ωa, the motor current Im is larger than the reference value Ix, and it is determined that the steering state of the steering wheel 2 at the time of the immediately preceding determination is the neutral state, it is determined in the current determination that the steering state of the steering wheel 2 is the neutral state.

When the absolute value of the steering speed ωs is lower than the determination value ωa and the motor current Im is larger than the reference value Ix, it is estimated that the steering state is one of the neutral state and the retained state. On the other hand, when the steering state determined at the time of the immediately preceding determination is the neutral state, it is estimated that the current steering state is one of the neutral state and the rotating state.

In the above configuration, in consideration of this point, when the absolute value of the steering speed ωs is lower than the determination value ωa, the motor current Im is larger than the reference value Ix, and it is determined that the steering state determined at the time of the immediately preceding determination is the neutral state, it is determined in the current determination that the steering state is the neutral state. Therefore, it is possible to further reduce the frequency of erroneous determination regarding the steering state of the steering wheel 2.

4) In the present embodiment, when the absolute value of the steering speed ωs is lower than the determination value ωa, the motor current Im is larger than the reference value Ix, and it is determined that the steering state of the steering wheel 2 at the time of the immediately preceding determination is not the neutral state, it is determined in the current determination that the steering state of the steering wheel 2 is the retained state.

When the absolute value of the steering speed ωs is lower than the determination value ωa and the motor current Im is larger than the reference value Ix, it is estimated that the steering state is one of the neutral state and the retained state. On the other hand, when the steering state determined at the time of the immediately preceding determination is other than the neutral state, it is estimated that the current steering state is one of the retained state and the rotating state.

In the above configuration, in consideration of this point, when the absolute value of the steering speed ωs is lower than the determination value ωa, the motor current Im is larger than the reference value Ix, and it is determined that the steering state at the time of the immediately preceding determination is not the neutral state, it is determined in the current determination that the steering state is the retained state. Therefore, it is possible to further reduce the frequency of erroneous determination regarding the steering state of the steering wheel 2.

5) In the present embodiment, when it is determined that the steering state of the steering wheel 2 is the retained state, the motor resistance Rm is calculated on the basis of the motor current Im and the motor voltage Vm, and the calculated motor resistance Rm is set as a new motor resistance Rm.

An actual resistance of the motor 21 changes. Therefore, when the motor resistance Rm stored as a value corresponding to the actual resistance is used to execute various computations, preferably, the motor resistance Rm is updated. On the other hand, when the steering state of the steering wheel 2 is the neutral state, the motor current Im and the motor voltage Vm are basically smaller than those in the retained state. Therefore, it is difficult to appropriately update the motor resistance Rm on the basis of the motor current Im and the motor voltage Vm.

In the above configuration, in consideration of this point, the motor resistance Rm is updated when it is determined that the steering state of the steering wheel 2 is the retained state. Therefore, it is possible to suppress a large deviation between the motor resistance Rm and an actual resistance of the motor 21.

Alternative Embodiments

Note that the invention is not limited to the embodiment described above; the invention may be, for example, implemented in the following alternative embodiments. In addition, the following alternative embodiments are not only applied to the above embodiment; a combination of the different alternative embodiments may also be implemented.

In the "steering state determining process" according to the above embodiment, when the absolute value of the steering speed ωs is lower than the determination value ωa and the motor current Im is larger than the reference value Ix, it is determined whether the steering state of the steering wheel 2 is the neutral state to thereby check whether the steering state of the steering wheel 2 is the "neutral state". The above determining process for checking may be modified as follows. That is, on the basis of whether the state where the motor current Im is kept within a predetermined range continues for a predetermined period of time or longer, whether the steering state of the steering wheel 2 is the "neutral state" can be checked. In the case of the "second neutral state", the width of variation in the motor current Im tends to be larger than that in the case of the "retained state". Therefore, when the above condition is not satisfied, it is estimated that the steering state is the "second neutral state". Thus, even when the determining process for checking is changed as described above, it is also possible to reduce the frequency of erroneous determination regarding the steering state of the steering wheel 2.

In the "steering state determining process" according to the above embodiment, it is determined in step S220 whether the steering state of the steering wheel 2 is the "neutral state" on the basis of the motor current Im; instead, it is possible to determine whether the steering state is the "neutral state" on the basis of the motor voltage Vm instead of the motor current Im.

In the "steering state determining process" according to the present embodiment, the steering state determined at the time of the immediately preceding determination is referenced in step S230. Instead of or in addition to this, it is also possible to refer the steering state determined at the time of determination before the immediately preceding determination.

In the above embodiment, the motor with a brush is provided as the motor 21 of the EPS actuator 20; instead, a brushless motor may be provided instead of the motor with a brush. In the above embodiment, the invention is applied to the columnar type electric power steering system 1; instead, the invention may also be applied to a pinion type electric power steering system or a rack assist type electric power steering system. In this case as well, a configuration similar to the above embodiment is employed. Thus, advantageous effects similar to the advantageous effects of the above embodiment may be obtained.

According to the invention, it is possible to provide an electric power steering system that is able to reduce the frequency of erroneous determination regarding the steering state of the steering wheel.

What is claimed is:

1. An electric power steering system comprising an electronic control unit configured to determine a steering state of a steering wheel based on at least one of detected values of current and voltage of a motor that applies assist force to a steering system, and a steering speed of the steering wheel, wherein
    a state where the steering wheel is retained at a position other than a neutral position is a retained state, and a state where the steering wheel is placed at the neutral position is a neutral state,
    when the steering speed is lower than a determination value and the detected value is larger than a reference value, it is determined whether the steering state of the steering wheel is the neutral state, and
    when the steering speed is lower than the determination value, the detected value is larger than the reference value, and it is determined that the steering state of the steering wheel is the neutral state at a time of immediately preceding determination, it is determined that the steering state of the steering wheel is the neutral state.

2. The electric power steering system according to claim 1, wherein
    when the steering speed is lower than the determination value, the detected value is larger than the reference value, and it is determined that the steering state of the steering wheel is not the neutral state at a time of immediately preceding determination, it is determined that the steering state of the steering wheel is the retained state.

3. The electric power steering system according to claim 1, wherein
    the electric power steering system has a function of updating a motor resistance that is a value indicating a resistance of the motor, and, when it is determined that the steering state of the steering wheel is the retained state, the resistance of the motor is calculated based on the current and voltage of the motor, and then the calculated resistance is set as a new motor resistance.

* * * * *